Jan. 18, 1966 D. T. WALSH 3,229,715
FLUID FLOW CONTROL VALVES
Filed Jan. 21, 1963 2 Sheets-Sheet 1
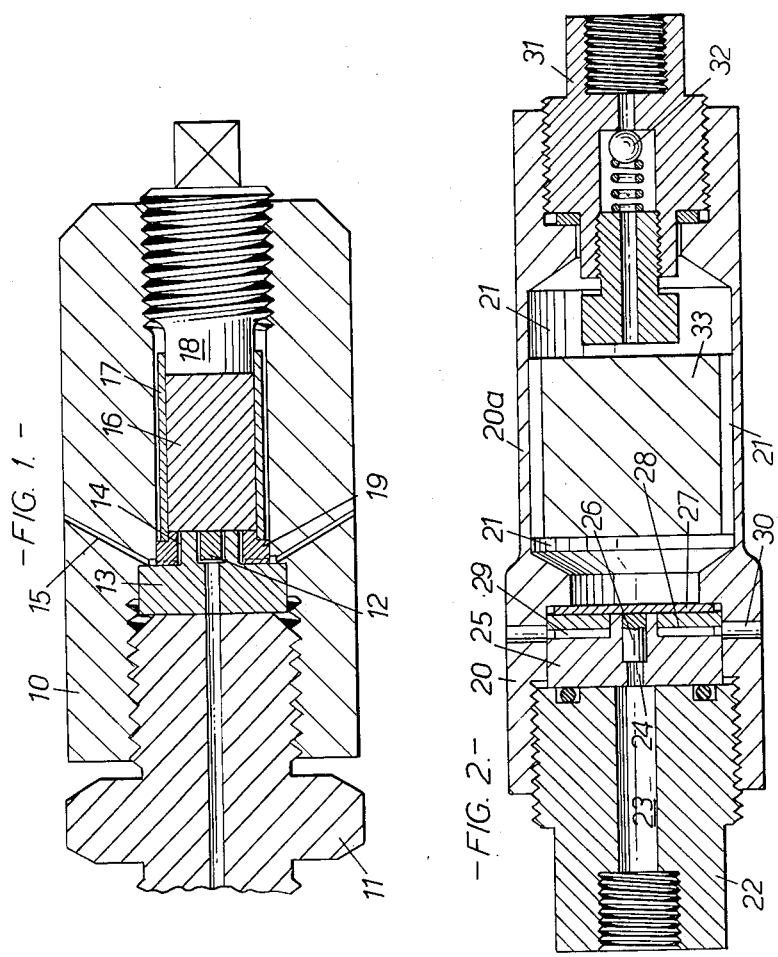
INVENTOR:
DONALD T. WALSH
BY Jan. 18, 1966  D. T. WALSH  3,229,715
FLUID FLOW CONTROL VALVES
Filed Jan. 21, 1963  2 Sheets-Sheet 2
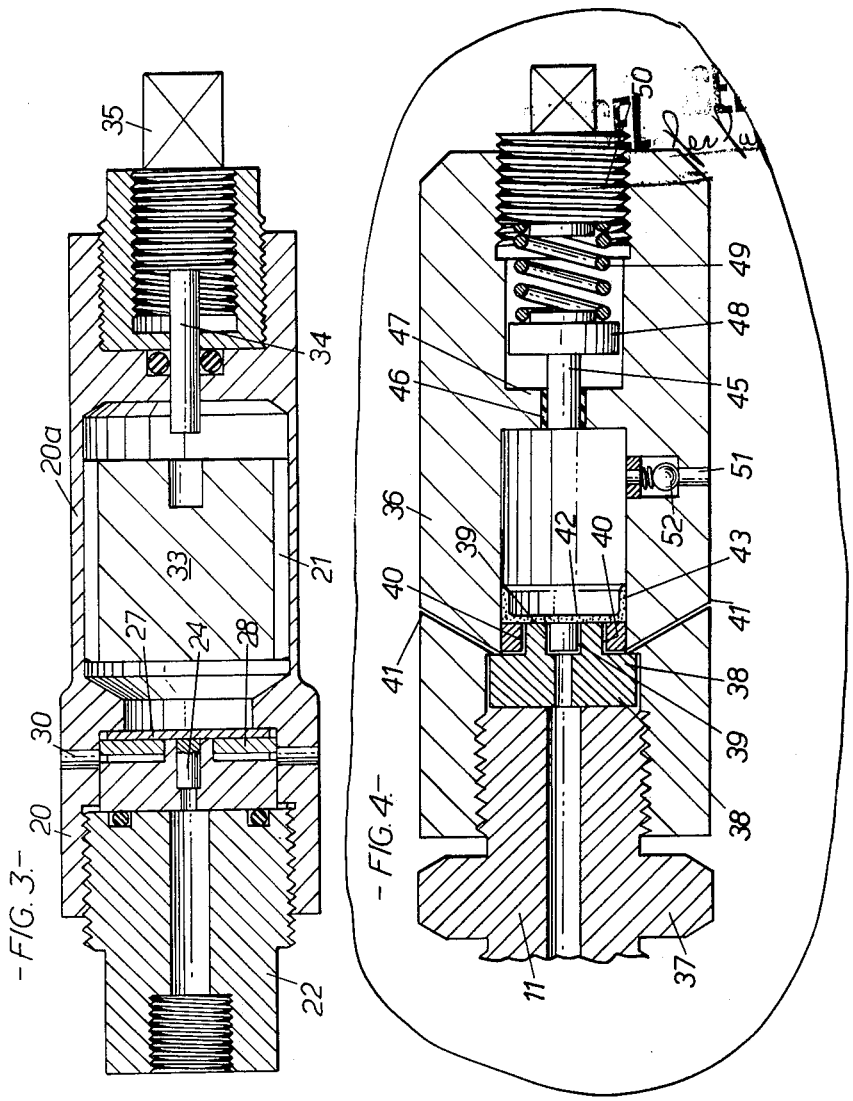
INVENTOR:
DONALD T. WALSH
BY

United States Patent Office 3,229,715
Patented Jan. 18, 1966

3,229,715
FLUID FLOW CONTROL VALVES
Donald T. Walsh, Hindley, Wigan, England, assignor to Gullick Limited, Wigan, England, a British company
Filed Jan. 21, 1963, Ser. No. 252,978
Claims priority, application Great Britain, Jan. 27, 1962, 3,192/62; Feb. 8, 1962, 4,851/62
6 Claims. (Cl. 137—525)

This invention is for improvements in or relating to fluid-pressure relief valves. Such valves are commonly known as yield or bleed valves.

A typical application of a yield valve is to a hydraulic pit prop or similar mine roof support. The purpose of the yield valve is to relieve the load on the prop, when it becomes excessive, by bleeding-off a small amount of the hydraulic fluid in the prop.

Yield valves as constructed heretofore have comprised a ball or other conventional valve member held on a seat by means of a spring, the loading on the spring predetermining the point at which the yield valve will open so as to permit a discharge of fluid and relieve the load on the prop. Valves of this kind have several defects and in particular the passage of fluid causes erosion of the ball or other valve member and its seating and after a relatively short period of working the performance of the valve becomes unreliable. One object of the present invention is to provide a much more reliable form of yield valve and one which will have a relatively long life.

According to the present invention there is provided a pressure relief valve comprising a casing including a tubular sheath having an elastic wall able to bulge and contract radially, port means at one end of said tubular sheath for release of pressure-fluid, a closure part for said port means, and a deformable body confined within said sheath and subjecting said port closure part to a force in a direction axially of the tubular sheath due to radial elastic straining of the elastic wall of said sheath whereby said closure part is urged against said port means for the closure thereof, said port means having means for preventing the extrusion into it of said closure part.

The expression "deformable body" where used in this specification is intended to mean a liquid or a deformable solid or semi-solid.

As regards a deformable solid, this may, for example, be a pad or block of synthetic resin plastics material, rubber or the like, or a semi-solid material of the nature of putty, capable of behaving like a fluid in transmitting the force or pressure of the resilient or elastic member uniformly onto the port closure member.

In one preferred embodiment of the invention the valve comprises a seating having a fluid discharge port, a flexible or pliable diaphragm for closing said port, a deformable body and means for applying pressure to the diaphragm, so as to close the port, through said body.

At an excessive fluid pressure the diaphragm or other closure member deforms the deformable body and lifts slightly off the seating so as to allow fluid to flow or bleed through the port. The elastic sheath gives the deformable body the necessary ability to recover its shape and to close the port when the excessive fluid pressure has been relieved. A separate port closing member may be dispensed with where the deformable body is a solid substance and a forward face of the deformable body itself will serve to close the exhaust or discharge port.

In case where pressure is applied to the port closure member through a deformable body of liquid, it is convenient to immerse a block of solid material in such liquid, this block being of a material having a low or zero thermal expansion coefficient and serving to limit the volume of liquid. The body of the valve can then be designed so that, should the ambient temperature where the valve is located increase, the expansion of the body of the valve will equal or approximately equal the expansion of the liquid and no change of internal pressure will take place likely materially to alter the setting of the valve.

Some particular embodiments of the invention will now be described, by way of example, with reference to the accompanying drawings wherein:

FIGURE 1 is a longitudinal sectional view of one embodiment,

FIGURE 2 is a longitudinal sectional view of a second embodiment,

FIGURE 3 is a longitudinal sectional view of a third embodiment.

The yield valve shown on FIGURE 1 of the drawing comprises a body part 10 having a nipple 11 at one end by which the yield valve is connected to the hydraulic circuit of the mine roof support. The bore of the nipple communicates with an annular port 12 in a valve seating 13. The annular port 12 is surrounded by an annular port 14 which communicates with fluid exhaust passages 15. The ports 12 and 14 are made in the form of small annular gaps to prevent the plastic plug or pad 16, which in this case constitutes both the deformable body and the port closure member, extruding into said ports.

The plastic plug or pad 16 is encased in a thin walled sleeve or sheath 17 made from a springy material such as spring steel or beryllium copper.

A member 18 is screw-threaded into the end of the body 10 remote from the nipple 11 and projects into the sleeve 17. By means of the member 18 the plastic plug or pad 16 is pressurised and applied to the valve seating 13 so as to close the ports 12 and 14. The screw-threaded member 18 also provides for adjustment of the pressure on the plastic pad.

The end of the sleeve 17 remote from the member 18 is supported and centered by means of a spigot on a ring 19 which surrounds the valve seating 13, and defines one wall of the port 14.

When the pressure of the fluid at the port 12 overcomes the pressure in the plastic pad 16 fluid flows, via the ports 12 and 14, to the exhaust passages 15.

The slight deformation of the plug 16, due to the passage or bleed-off of fluid must be accommodated by elasticity and this is provided for by the spring sleeve 17. As mentioned, the sleeve 17 is made with a thin wall from a springy material and it will be proportioned to give the necessary elasticity to allow the valve to work.

The embodiment of the invention shown in FIGURE 2 comprises a casing 20 made of, for example, beryllium copper and having a thin-walled elastic section 20a which in this case serves as an elastic enclosure for a body of liquid (e.g., compressible silicone fluid) in the space 21.

At one end of the casing there is provided a union 22 by which the yield valve is connected to the hydraulic circuit of the mine roof support. The union 22 has a passage 23 which communicates with a port 24 in a valve seating 25. The port 24 has fitted into it a plug 26 of sintered material of sufficient porosity to allow for a flow of liquid. Passage of liquid through the port 24 and plug 26 is normally prevented by a flexible diaphragm 27 clamped, at its periphery, against one face of a disc 28 which is also of sintered material of sufficient porosity to allow for the passage of liquid. There is a space 29 behind the disc 28 which space communicates with exhaust or bleed ports 30.

At the end of the casing 20, remote from the union 22, there is provided a pipe coupling element 31 in which there is embodied a check or non-return valve 32.

Located in the liquid in the space 21 is a solid block 33 of a material having a very low or zero thermal expansion coefficient. This solid block of low thermal expansion may be replaced by numerous small spheres, or even by a suspension of small solid particles in the pressurised fluid. The block 33 reduces the volume of liquid in the space 21 so that thermal changes to which it may be subjected do not materially upset the setting of the valve particularly if the casing 20 is of such a metal that it will compensate, at least approximately, for any expansion or contraction of the liquid in the space 21 due to temperature changes.

For use, the yield valve is pressurised internally to the required extent by connecting the pipe union 31 to a source of fluid and injecting such fluid into the space 21 until the pressure on the diaphragm 27 is such that it will maintain the port 24, 26 closed unless the pressure in such port becomes excessive, i.e. exceeds the yield load to which the valve has been pressurised as just described. If the yield load is reached then the diaphragm 27 flexes away from the plug 26 and fluid from the port 24 is permitted to bleed via said plug and the disc 28 to the bleed ports 30.

The embodiment of the invention shown in FIGURE 3 is similar to that just described with reference to FIGURE 2 and where applicable like reference numerals have been used to designate like parts.

In the embodiment of the invention shown in FIGURE 3, however, pressurising of the yield valve, i.e., adjustment of the pressure applied to the diaphragm 27 through the body of liquid in the space 21 is effected by means of a plunger 34 secured to, and adapted to be adjusted inwardly or outwardly with respect to the space 21 by means of a screw-threaded member 35.

I claim:

1. A pressure relief valve comprising a valve body having inlet and outlet port means therein, a closure part in said body for said outlet port means, a deformable substantially non-compressible mass within said body and bearing on said closure part to close said outlet port means, said valve body being provided with means including a tubular resilient continuous circumferential sheath enclosing said mass and designed to urge said mass toward said closure part with a selected force but being expansible, to permit deformation of said mass and accommodate movement of said closure part to open said outlet port means to relieve pressure in excess of said force, and contractable to effect closure of said port means upon relief of such excess pressure.

2. A pressure relief valve according to claim 1 wherein said deformable mass comprises a liquid.

3. A valve as claimed in claim 2 wherein a body of a material having a low thermal expansion coefficient is positioned in said mass of liquid to reduce materially the volume of liquid confined in the sheath so that thermal changes do not materially upset the setting of the valve.

4. A pressure relief valve according to claim 2 wherein said outlet port means has inserted therein means for preventing the extrusion into it of said closure part and said closure part is a flexible diaphragm positioned over said port means.

5. A pressure relief valve according to claim 1 wherein said valve body is tubular and includes an integral thinned wall section between its ends forming said resilient sheath.

6. A pressure relief valve according to claim 5 wherein closure means is provided for the end of said valve body opposite said port means, said deformable mass being a body of liquid confined within and filling the space defined by the thinned wall section of the valve body, said closure means and said port closure part, and means is also provided for charging the tubular valve body with said liquid to a predetermined pressure so that the thinned wall section thereof is strained radially with respect to the valve body and the port closure part is subjected to a force, in the axial direction of the valve body, due to radial elastic straining of said thinned wall section.

References Cited by the Examiner

UNITED STATES PATENTS

| | | |
|---|---|---|
| 2,401,237 | 5/1946 | Gamble. |
| 2,615,670 | 10/1952 | Nelson _____ 251—277 |
| 2,733,060 | 1/1956 | Taylor. |
| 2,800,321 | 7/1957 | Jarret. |
| 2,859,033 | 3/1958 | Rose. |
| 2,908,290 | 10/1959 | Hamilton-Peters ____ 251—57 X |
| 2,910,998 | 11/1959 | Davis _____ 137—375 |
| 2,982,537 | 5/1961 | Rumsey. |
| 3,080,159 | 3/1963 | Orner. |

FOREIGN PATENTS 1,250,997  12/1960  France.

ISADOR WEIL, *Primary Examiner.*

WILLIAM F. O'DEA, MARTIN P. SCHWADRON,
*Examiners.*

J. O'NEILL, *Assistant Examiner.*